(12) United States Patent
Beiter et al.

(10) Patent No.: US 7,698,569 B2
(45) Date of Patent: Apr. 13, 2010

(54) DATA OBJECT IDENTIFICATION, TRACKING, FILTERING AND MONITORING USING DATA OBJECT FINGERPRINTS

(75) Inventors: Randy B. Beiter, North Olmsted, OH (US); David S. Keyes, Strongsville, OH (US); Sashi Kolli, Bay Village, OH (US); Charles M. Stack, Cleveland, OH (US)

(73) Assignee: BEA Systems, Inc., Redwood Shores, CA (US)

(*) Notice: Subject to any disclaimer, the term of this patent is extended or adjusted under 35 U.S.C. 154(b) by 1398 days.

(21) Appl. No.: 11/106,469

(22) Filed: Apr. 15, 2005

(65) Prior Publication Data

US 2006/0130125 A1 Jun. 15, 2006

Related U.S. Application Data

(60) Provisional application No. 60/629,298, filed on Nov. 19, 2004.

(51) Int. Cl.
*G06F 11/30* (2006.01)

(52) U.S. Cl. ............... 713/189; 713/186; 382/115; 382/125; 382/275

(58) Field of Classification Search ............ 726/4; 382/125, 124, 115, 275; 235/380; 713/186, 713/189
See application file for complete search history.

(56) References Cited

U.S. PATENT DOCUMENTS

| | | | |
|---|---|---|---|
| 6,654,746 B1 * | 11/2003 | Wong et al. | 707/10 |
| 6,658,423 B1 | 12/2003 | Pugh et al. | |
| 6,917,902 B2 * | 7/2005 | Alexander | 702/189 |
| 2003/0055903 A1 | 3/2003 | Freed | |
| 2005/0022004 A1 | 1/2005 | Mihcak et al. | |

OTHER PUBLICATIONS

Internet Archive: Live Music Archive, Feb. 12, 2005, http://www.archive.org/audio/etree-check-archive.php.

* cited by examiner

*Primary Examiner*—Thanhnga B Truong
(74) *Attorney, Agent, or Firm*—Fliesler Meyer LLP

(57) ABSTRACT

The present invention relates to, among other things, the use of digital object fingerprints to account for digital objects.

22 Claims, 18 Drawing Sheets

| CUID | DOID |
|---|---|
| CUID-1 | DOID-1 |
| CUID-1 | DOID-3 |
| CUID-1 | DOID-5 |
| CUID-2 | DOID-1 |
| CUID-2 | DOID-4 |
| ⋮ | ⋮ |

| DOID | # computers on which the data object was found |
|---|---|
| DOID-1 | 211 |
| DOID-2 | 55 |
| DOID-3 | 1 |
| DOID-4 | 699 |
| DOID-5 | 99 |
| ⋮ | ⋮ |

FIG. 3A

DATA OBJECT IDENTIFICATION, TRACKING, FILTERING AND MONITORING USING DATA OBJECT FINGERPRINTS

This application claims the benefit of U.S. Provisional Patent Application No. 60/629,298, filed on Nov. 19, 2004, the entire contents of which are incorporated herein.

BACKGROUND OF THE INVENTION

1. Field of the Invention

The present invention relates to systems and methods for identifying digital objects. More specifically, the invention relates to systems and methods that use digital object fingerprints to identify digital objects. Such systems and methods can be used to track, monitor and filter identified digital objects.

2. Discussion of the Background

There exists a need to identify, track, monitor and filter digital objects. As used herein, the term "digital object" refers to any message (i.e., any set of data). For example, any file stored on a computer's hard drive is a digital object. Similarly, the entire set of data stored on the hard drive can be considered a digital object. As another example, a set of bits (i.e., one or more bits) stored in a record or field of a database can be considered a digital object.

One example environment where it is important to identify digital objects is a high-security computing environment. In a high-security computing environment, only "trusted" digital objects should be stored on a secured computer (an example of an un-trusted digital object is a file that includes code implementing a virus). In order to determine whether a digital object is trusted, one must first identify the digital object and then, based on the identification, determine whether the digital object is trusted.

Accordingly, there is a need for systems and methods that can identify, track, monitor and/or filter digital objects.

SUMMARY OF THE INVENTION

In one aspect, the present invention provides a system and method for tracking digital objects using fingerprints corresponding to the digital objects.

In one embodiment, the method includes obtaining a first fingerprint corresponding to a first digital object, wherein the first fingerprint is a function of the content of the first digital object; storing the first fingerprint; receiving from a client system a message including a second fingerprint corresponding to a second digital object and an identifier identifying the client system and/or a user of the client system; determining whether the second fingerprint is identical to the first fingerprint; determining whether the received identifier is stored in a database and associated with an identifier identifying the first digital object or an asset comprising the first digital object if it is determined that the second fingerprint is identical to the first fingerprint; and storing the identifier in the database such that the stored identifier is associated with an identifier identifying the first digital object or the asset.

In another aspect, the present invention provides an apparatus having computer usable media with computer readable instructions embodied in the media. In one embodiment, the computer readable instructions include: a first set of instructions for storing a first fingerprint corresponding to a first digital object, wherein the first fingerprint is a function of the content of the first digital object; a second set of instructions for receiving from a client system a message including a second fingerprint corresponding to a second digital object and an identifier identifying the client system and/or a user of the client system; a third set of instructions for determining whether the second fingerprint is identical to the first fingerprint; a fourth set of instructions for determining whether the received identifier is stored in a database and associated with an identifier identifying the first digital object if the fourth set of instructions determines that the second fingerprint is identical to the first fingerprint; and a fifth set of instructions for storing the identifier in the database such that the stored identifier is associated with an identifier identifying the first digital object if the fifth set of instructions determines that the received identifier is not stored in the database and associated with an identifier identifying the first digital object.

In another aspect the present invention provides a method for monitoring files used by a programmer in connection with the development of a software component, wherein the files used by the programmer include a first set of files.

In one embodiment, the method includes, for each file included in the first set of files, obtaining a fingerprint corresponding to the file, thereby obtaining a first set of fingerprints; defining a second set of files, wherein each file included in the second set of files is a file that should be included in the first set of files; for each file included in the second set of files, obtaining a fingerprint corresponding to the file, thereby obtaining a second set of fingerprints; storing the second set of fingerprints; and determining whether each file included in the second set of files is also included in the first set of files, wherein the determining step comprises determining whether each fingerprint included in the second set of fingerprints is identical to a fingerprint included in the first set of fingerprints, wherein each obtained fingerprint is a function of the content of the file corresponding to the fingerprint.

In another embodiment, the method includes, defining a second set of files, wherein each file included in the second set of files is a file that should not be included in the first set of files; for each file included in the second set of files, obtaining a fingerprint corresponding to the file, thereby obtaining a set of fingerprints; storing the set of fingerprints; and determining whether at least one of the files included in the second set of files is also included in the first set of files, wherein the determining step includes: obtaining a fingerprint corresponding to a file included in the first set of files and determining whether the fingerprint corresponding to the file included in the first set of files is identical to a fingerprint corresponding to a file included in the second set of files, wherein each obtained fingerprint is a function of the content of the file corresponding to the fingerprint.

The above and other aspects, features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

FIG. 3A illustrates an accounting database according to a first embodiment.

DETAILED DESCRIPTION OF PREFERRED EMBODIMENTS

Figure 1:
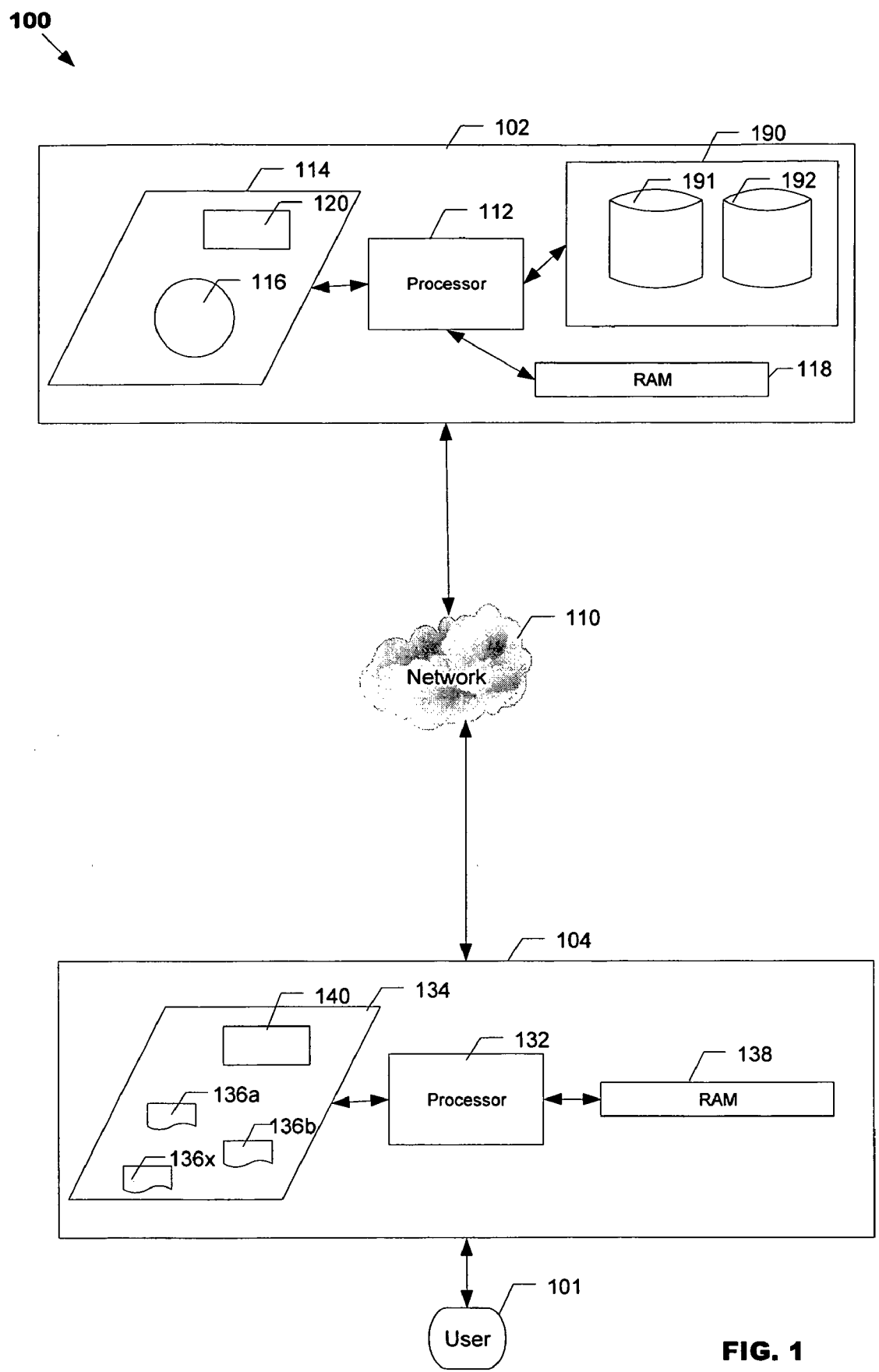
FIG. 1 illustrates a system according to one embodiment.

FIG. 1 illustrates a system 100 according to one embodiment of the invention. System 100 includes at least one server system 102 and at least one client system 104. Although not shown, system 100 preferably includes more than one client system 104 and may include more than one server system 102.

Server system 102 includes at least one processor 112 for executing software, at least one storage device 114 for storing a collection of digital objects 116 (a.k.a., digital object repository 116 or file repository 116), and at least one storage device 118 that is used to store the software that is being executed by processor 112. Storage device 114 preferably includes a disk drive and storage device 118 preferably includes random access memory. Server system 102 also includes data-object tracking server software 120.

As also shown in FIG. 1, server system 102 may include a database system 190, which may include one or more databases. For example, in the embodiment shown, database 190 includes a fingerprint database 192 and an accounting database 191. And although database 191 is shown as being separate and distinct from database 192, it is contemplated that a single database can implement databases 191 and 192. As used herein, the term "database" includes any collection of data. Accordingly, a simple text file may be considered a database.

Client system 104 includes at least one processor 132 for executing software, at least one storage device 134 for storing digital objects 136a-x, and at least one storage device 138 that is used to store the software that is being executed by processor 132. Storage device 134 preferably includes a disk drive and storage device 138 preferably includes random access memory. Client system 104 also includes data-object tracking client software 140.

Figure 2:
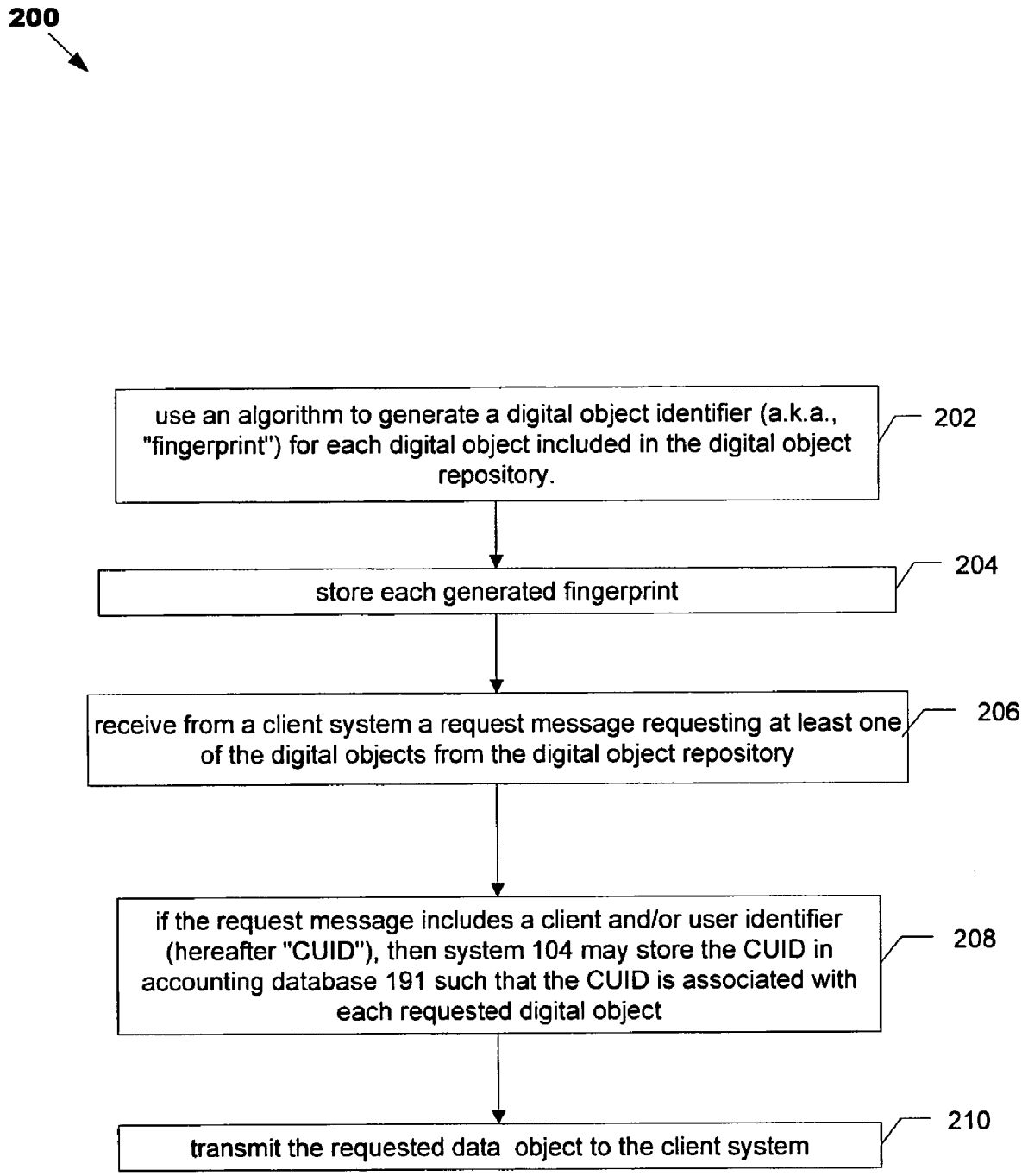
FIG. 2 is a flow chart illustrating a process according to one embodiment.

Referring now to FIG. 2, FIG. 2 is a flow chart illustrating a process 200 performed by server system 102. Process 200 may be implemented by data-object tracking server software 120.

Process 200 may begin in step 202, wherein server system 102 uses an algorithm to generate a digital object identifier (a.k.a., "fingerprint") for each digital object included in digital object repository 116. In a preferred embodiment, for each digital object included in repository 116, server system 102 uses the content of the digital object to generate the identifier. For example, server system 102 may use the content of the digital object as input to a hashing algorithm to create a hash value for the digital object, which hash values is used as the fingerprint. For example, server system 102 may use the MD5 algorithm to create a fingerprint for a digital object. However, the invention is not limited to any particular algorithm for generating a fingerprint.

In step 204, server system 102 stores each generated fingerprint. For example, the fingerprints may be stored in fingerprint database 192 of database system 190.

In step 206, server system 102 receives from a client system 104 a request message requesting system 104 to transmit to the client system 104 at least one of the digital objects from the digital object repository 116. Accordingly, the request message preferably includes a digital object identifier identifying the at least one digital object. For example, if the digital object is a file, the digital object identifier may be or include the filename of the file. A network 110 may facilitate the transmission of the request message from client 104 to server 102.

The request message may further include a client system identifier (e.g., an Internet Protocol (IP) or Media Access Layer (MAC) address associated with the client system 104 or other information that can be used to identify the client system 104) and/or a user identifier that can be used to identify the user of client system 104 (e.g., user 101's username or other information that can be used to identify user 101). Additionally, the request may include contextual information. Contextual information may include an application identifier that identifies an application, a workspace identifier that identifies a workspace and/or a project identifier that identifies a project.

In step 208, if the request message includes a client and/or user identifier (hereafter "CUID"), then system 104 may store the CUID in accounting database 191 such that the CUID is associated with each requested digital object. In this way, server system 102 can maintain information regarding the digital objects requested by any client/user. Additionally, the database may be structured so that, for any given digital object, the server system 102 can easily determine each client/user that has requested the given digital object or each client on which the given digital object is or was stored.

Further, for each digital object in the repository, server system 102 may keep a record of the number of clients on which the digital object is stored. For example, server system 102 may store in accounting database 191 a value representing the number clients on which a particular digital object is stored, and, when server system 102 receives a new request for the particular digital object, server system 102 increments the value.

Referring now to FIG. 3A, FIG. 3A illustrates accounting database 191 according to some embodiments of the invention. Database 191 may include a table 302 (or other data structure) that associates CUIDs with digital object identifiers (e.g., digital object fingerprints and/or other digital object identifiers). In the example shown, CUID-1 is associated with digital object identifiers DOID-1, DOID-3 and DOID-5.

Accordingly, accounting database 191 indicates that the client/user associated with CUID-1 has previously downloaded or otherwise acquired the digital objects identified by digital object identifiers DOID-1, DOID-3, and DOID-5. Database 191 (or other database within system 190) may also include a table 304 (or other data structure) that can be used to keep track of the number of times each digital object in the repository 116 has been requested by a client/user and/or, for each digital object, the number of clients on which the digital object is stored. Although not shown, contextual information as well as the CUID information may also be stored in the database.

Figure 3B:
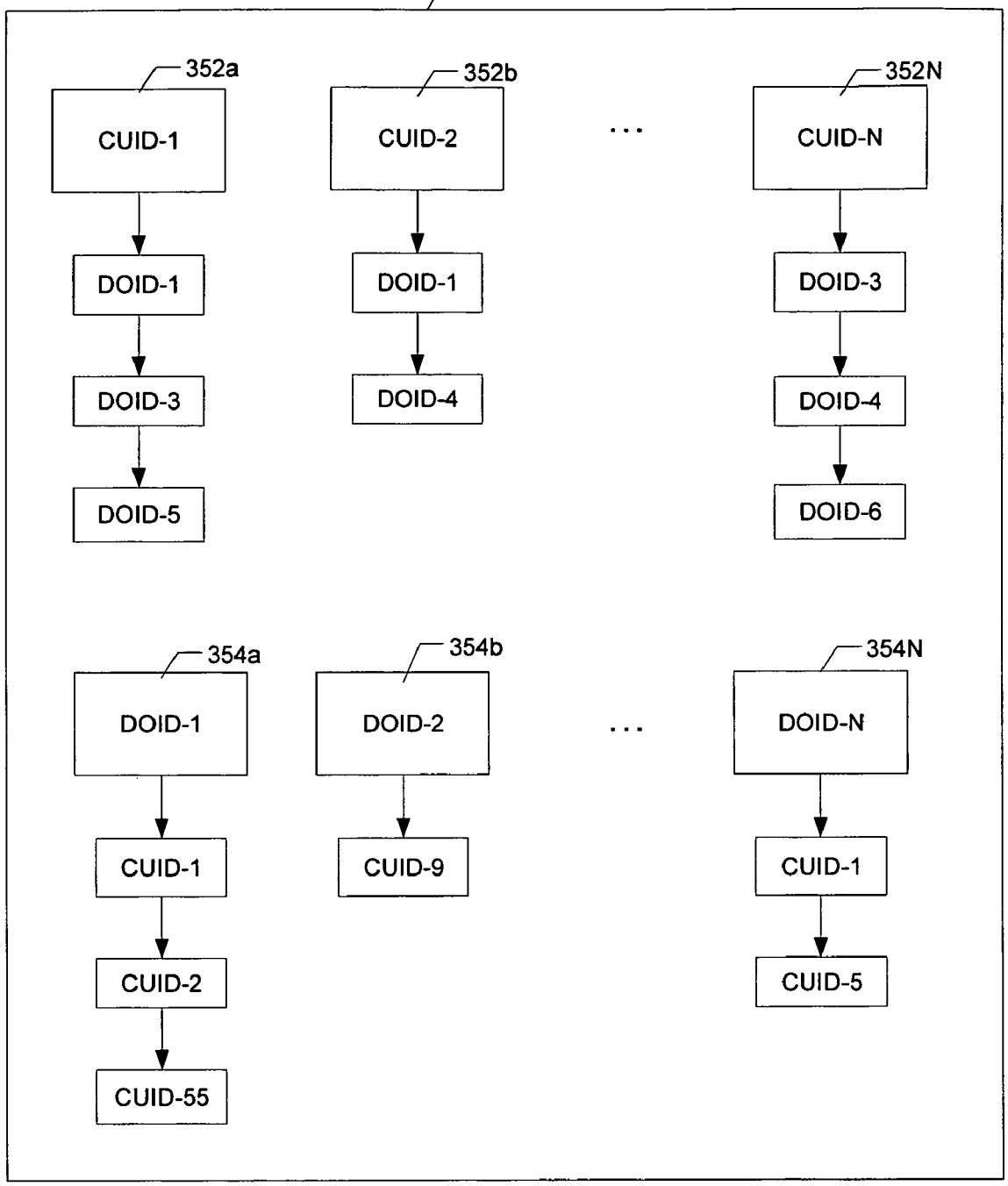
FIG. 3B illustrates an accounting database according to a second embodiment.

FIG. 3B illustrates an alternative structure of database 191. As shown in FIG. 3B, database 191 may include linked lists 352a-N, 354a-N (or other data structures) for associating CUIDs with DOIDs instead of table 302.

Referring back to FIG. 2, in step 210, server system 102 transmits the requested digital object(s) to client system 104.

Figure 4:
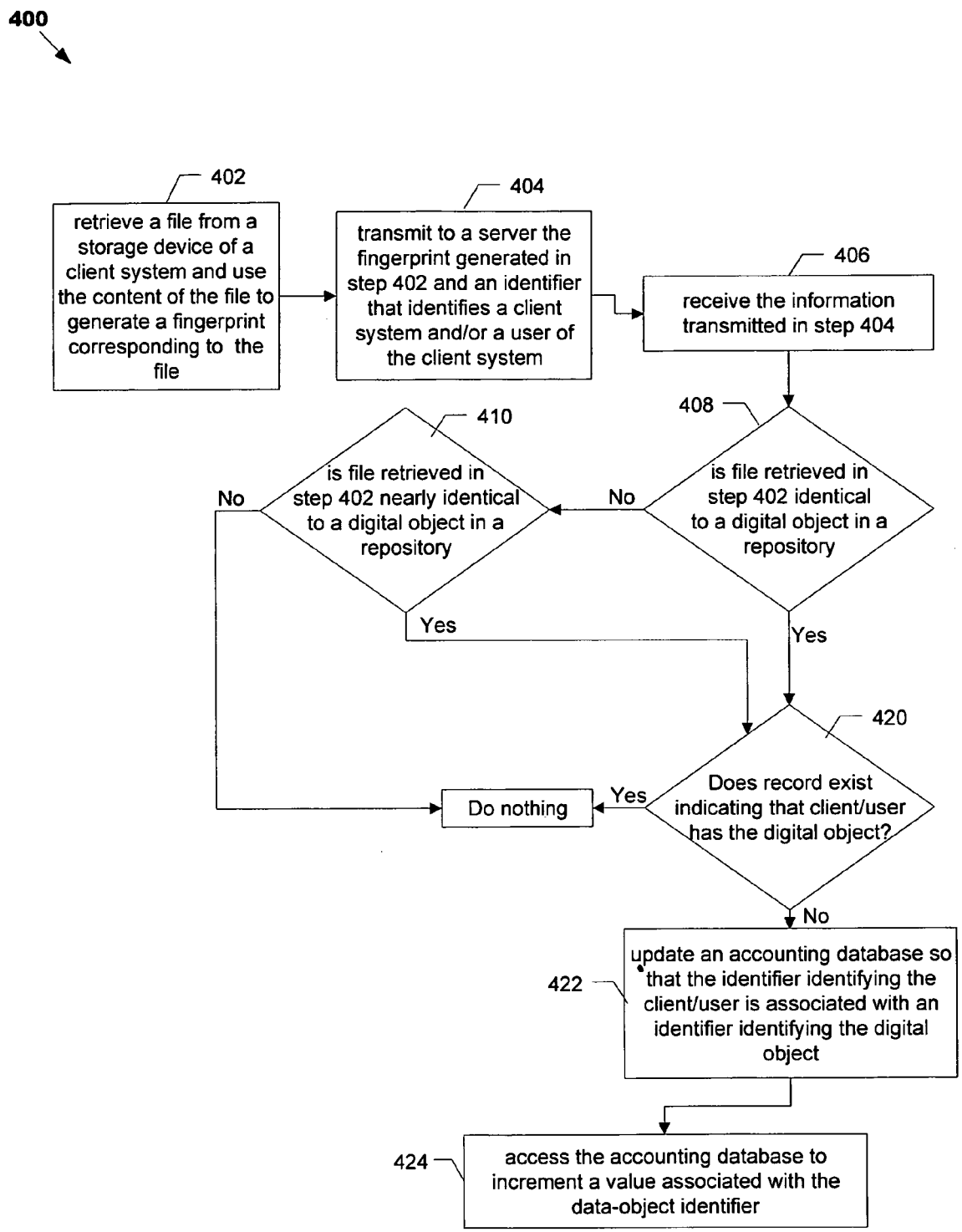
FIG. 4 is a flow chart illustrating a process according to one embodiment.

Referring now to FIG. 4, FIG. 4 is a flow chart illustrating a process 400, according to one embodiment, implemented partly by data-object tracking client software 140 and partly by data-object tracking server software 120.

Process 400 may begin in step 402, where client system 104 retrieves a file from storage system 134 and generates a fingerprint for the file using the same algorithm that server system 102 uses in step 202 of process 200 to generate the digital object fingerprints.

In step 404, client 104 transmits to server 102 information, which information includes the fingerprint generated in step 402 and which information may include a CUID that identifies the client system 104 and/or a user of client system 104. Steps 402 and 404 may be repeated for each file stored in storage system 134 or for each file stored in one or more predefined folders of a file system. In step 404, contextual information may also be transmitted to server 102.

In step 406, server system 102 receives the information transmitted in step 404 (i.e., the CUID and fingerprint and contextual information, if any).

In step 408, server system 102 determines whether the received fingerprint is identical to the fingerprint of a digital object in the repository 116. As discussed above with reference to process 200, server system 102, for each digital object in the repository 116, may store the digital object's fingerprint in the fingerprint database 192. Thus, in some embodiments, to determine whether the received fingerprint is identical to a fingerprint of a digital object in the repository 116, server system 102 need only search fingerprint database 192 for an identical fingerprint.

If, in step 408, server system 102 determines that the received fingerprint is identical to a fingerprint of a digital object in repository 116, process 400 may proceed to step 420, otherwise process may proceed to step 410.

In step 410, server system 102 determines whether the file retrieved in step 402 is nearly identical to a digital object included in repository 116. In one embodiment, server system 102 determines this by determining whether the received fingerprint is substantially similar to the fingerprint of a digital object in repository 116.

In this embodiment, the algorithm used by the client 104 and server 102 to generate fingerprints is, preferably, an algorithm that produces a first fingerprint for a first digital object and a second fingerprint for a second digital object such that if the first and second digital objects are nearly identical, then the first fingerprint will likewise be nearly identical to the second fingerprint. One such fingerprint generating system is described in U.S. Patent Publication No. 20050022004, which published on Jan. 27, 2005 (the contents of which are incorporated herein by this reference).

If, in step 410, server system 102 determines that the file retrieved in step 402 is nearly identical to a digital object included in repository 116, then process 400 may proceed to step 420.

In step 420, server system 102 determines whether it has a record indicating that the client/user has possession of the digital object in repository 116 that is identical or nearly identical to the file identified by the fingerprint received in step 406. If server system 102 does not have such information, then process 400 may proceed to step 422.

In some embodiments, to make the above determination, server system 102 searches accounting database 191 to determine whether the accounting database includes information associating the CUID received in step 406 with a DOID that identifies the digital object in repository 116 that is identical or nearly identical to the file identified by the fingerprint received in step 406. For example, in some embodiments, server system 102 may search table 302 for a record that associates the CUID with the DOID.

In step 422, server system 102 may update accounting database 191 so that the CUID and the DOID are associated with each other. For example, in the embodiments where accounting database 191 includes table 302, server system 102 may add a record to table 302, wherein a first field of the record stores the received CUID and a second field of the record stores the DOID that identifies the digital object in repository 116 that is identical or nearly identical to the file identified by the fingerprint received in step 406.

In step 424, server system 102 may access table 304 of accounting database 191 to increment the value associated with the DOID.

Process 400 may be performed periodically (i.e., from time to time). That is, for example, in some embodiments, data-object tracking server software 120 may continuously wait for data from any instance of data-object tracking client software 140, and each instance of data-object tracking client software 140 may periodically perform steps 402-404. For example, data-object tracking client software 140 may be configured to perform steps 402-404 hourly, daily, weekly or according to some other schedule.

One advantage of the system described above is that, for each client system 104 that can communicate with server system 102, server system 102 can determine whether the client system 104 has stored therein one or more digital objects that are in repository 116, regardless of whether the client system 104 received the digital object from repository 116 or from another source. Thus, for example, if a user of a first client system 104 downloads to the first client system 104 a file from repository 116 and then makes a copy of the file and transfers the copy to a user of a second client system 104, the server system 102 will, in some embodiments, eventually determine that the second client system 104 has a copy of the file because the second client system 104, in some embodiments, periodically transmits to server system 102 the fingerprint of each file stored in client system 104 (or each file stored in one or more predefined folders).

Figure 5:
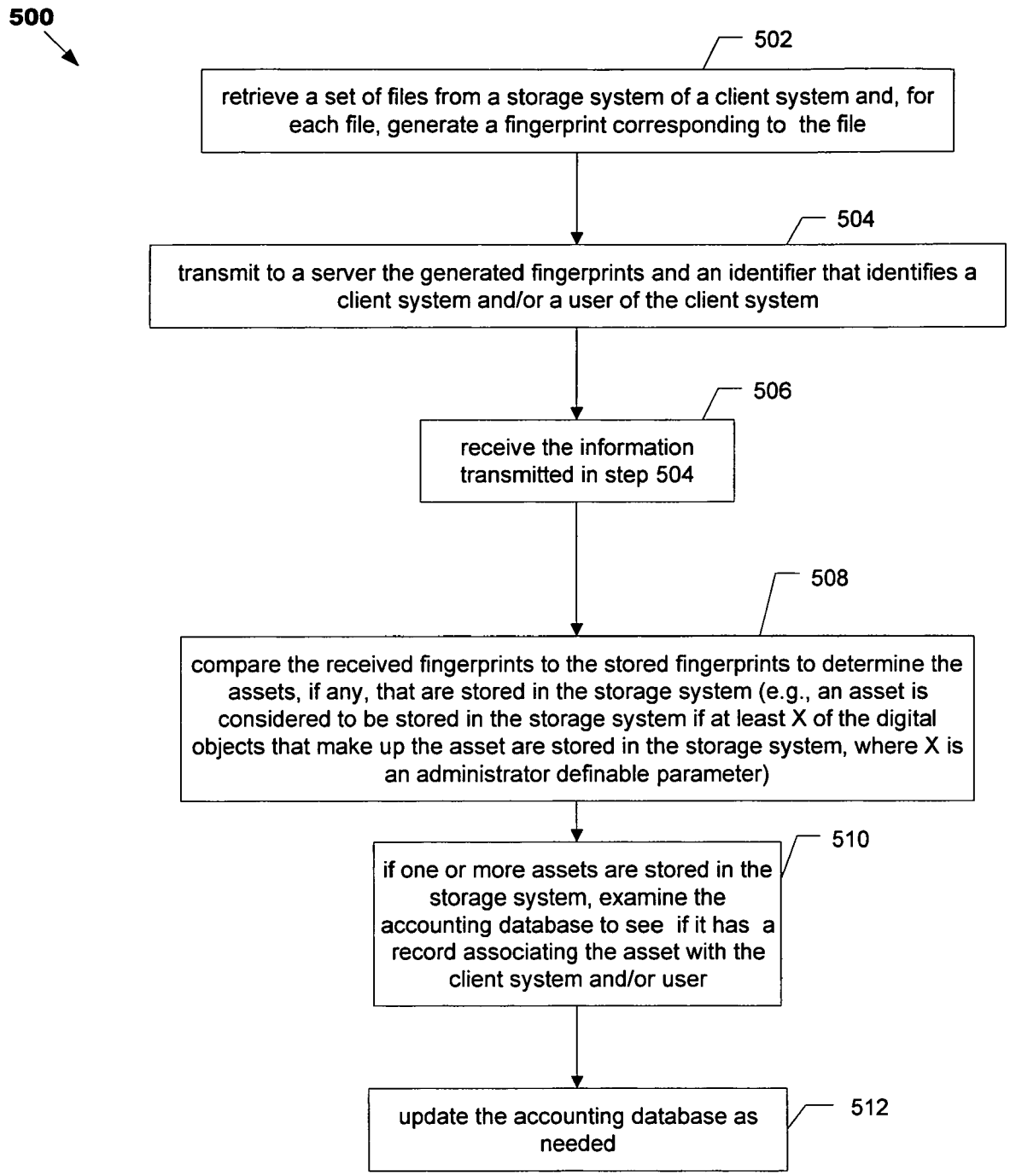
FIG. 5 is a flow chart illustrating a process according to another embodiment.

Referring now to FIG. 5, FIG. 5 is a flow chart illustrating a process 500 according to an embodiment of the invention.

Process 500 may begin in step 502, where client system 104 retrieves a set of files from storage system 134 and generates a fingerprint for each of the files using the same algorithm that server system 102 uses in step 202 of process 200 to generate the digital object fingerprints.

In step 504, client 104 transmits to server 102 information, which information includes the fingerprints generated in step 502 and which information may include a CUID that identifies the client system 104 and/or a user of client system 104. In step 504, contextual information may also be transmitted to server 102.

In step 506, server system 102 receives the information transmitted in step 504 (i.e., the CUID and fingerprint and contextual information, if any).

In step 508, server system 102 compares the received fingerprints to the stored fingerprints to determine the assets, if any, that are stored in the storage system 134. In a preferred embodiment, an asset is considered to be stored in the storage system 134 if at least X of the digital objects that make up the asset are stored in the storage system, where X can be any whole number greater than or equal to 1. For example if Asset A consists of digital objects do1, do2, do3, do4 and d05 and digital objects d01 and d03 are stored in storage system 134, then, in a preferred embodiment where X is greater than or equal to two, Asset A is considered to be stored in storage system 134.

In step 510, if server system 102 determines that one or more assets are stored in the storage system, server system 102 examines the accounting database 191 to see if it has a record associating the asset with the client system and/or user (e.g., the CUID). If there is no record, then server system 102 may update the accounting database 191 so that the database will store information that indicates that the client system/user has possession of the asset (step 512). For example, the CUID and an asset identifier may be stored in a record of the database or the CUID may be stored in a record and associated with an identifier identifying the asset.

Figure 6:
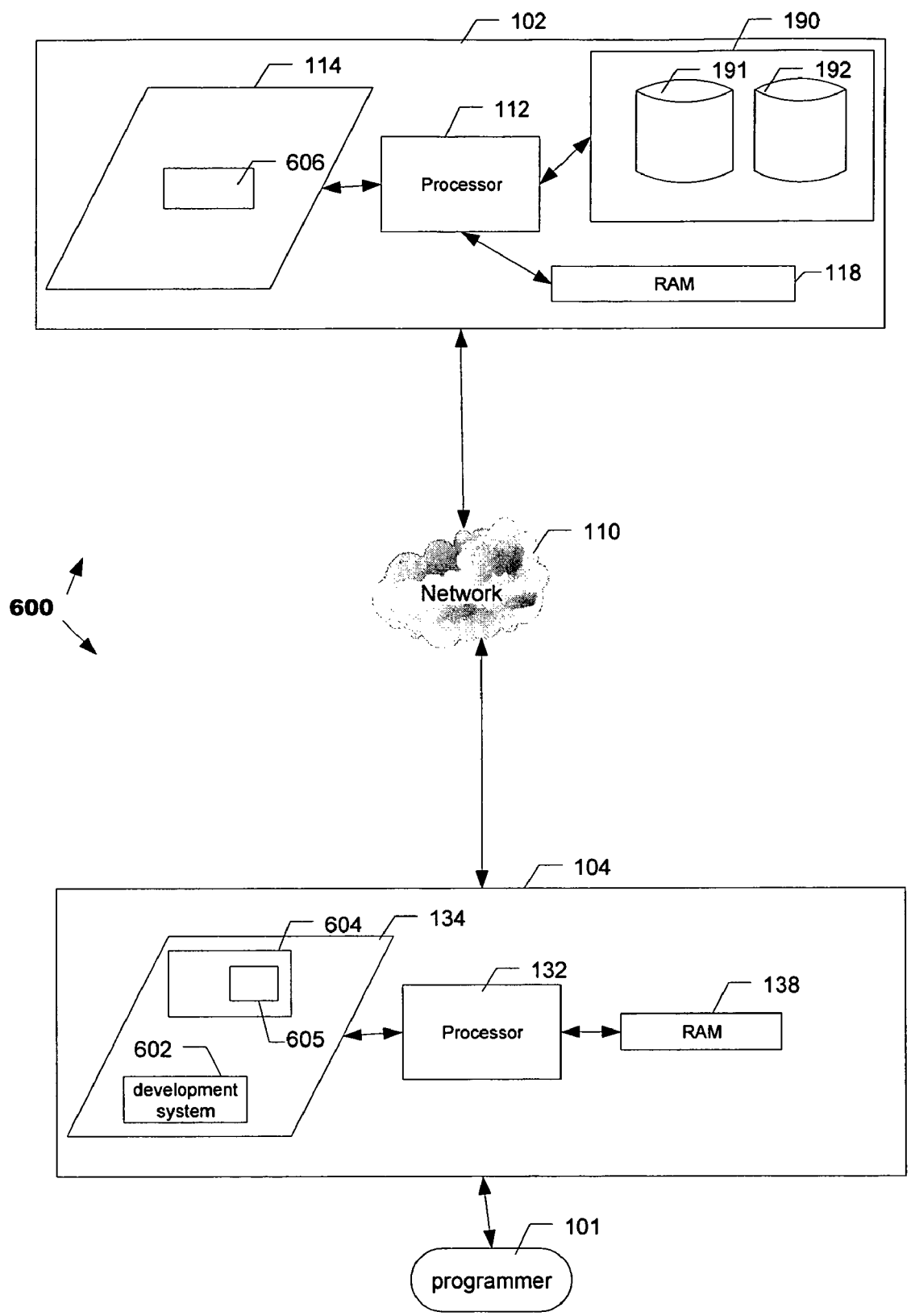
FIG. 6 illustrates a system according to another embodiment.

Referring now to FIG. 6, FIG. 6 illustrates a system 600 according to another embodiment of the invention. System 600 is similar to system 100 except that, in system 600, client system 104 includes a software development system 602 which is used by software developers (a.k.a., programmers) to create other software. Software development system 602 may include a conventional build tool (e.g., the Apache Ant build tool) and/or a conventional integrated development environment (IDE) (e.g., the Eclipse or the Microsoft® Visual Studio® IDE). Additionally, data-object tracking software 604, or one component 605 thereof, is/are incorporated or linked with software development system 602. For example, in one embodiment, software 604 (or component thereof) is a plug-in for the Apache Ant build tool, and in another embodiment is a plug-in for the Eclipse IDE. In some embodiments, software 604 includes a component 606 that is installed and runs on server system 102.

Figure 7A:
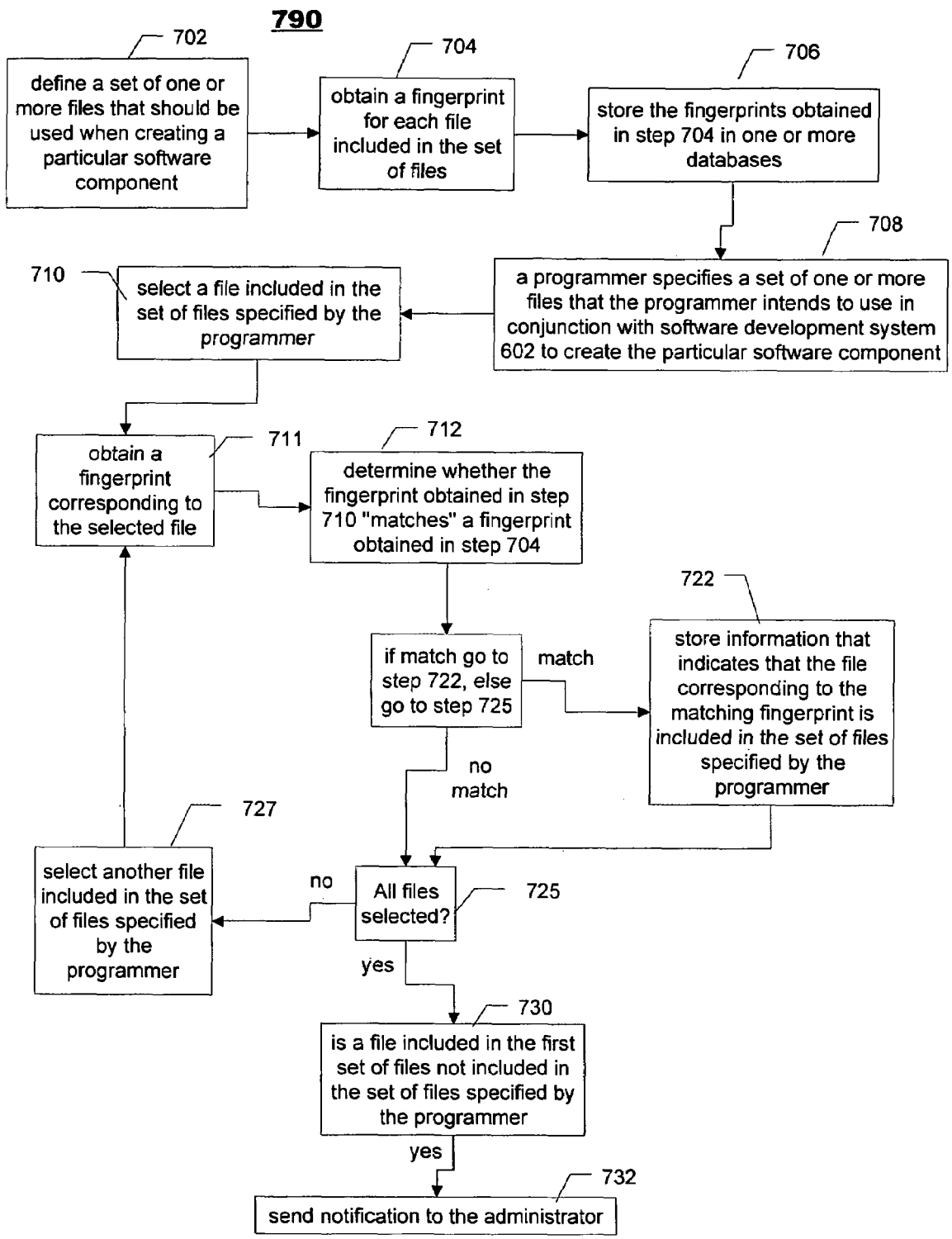
FIGS. 7A-C are a flow charts illustrating processes according to various embodiments of the invention.

Referring now to FIG. 7A, FIG. 7A is a flow chart illustrating a process 790 that may, in part, be implemented by data-object tracking software 604.

Process 790 may begin in step 702, where an administrator defines a first set of files that should be used when creating a particular software component. The first set of file may include one or more files. For example, the administrator may create or input a list of file identifiers such that each file identifier identifies a file that should be used when creating the particular software component.

In step 704, a fingerprint is obtained for each file included in the first set of files. For example, for each file included in the first set of files, the file may be retrieved from a storage device and the content of the file used to create a fingerprint for the file. As discussed above, a hashing algorithm may be employed to create the fingerprint.

In step 706, the fingerprints obtained in step 704 are stored in one or more databases. For example, the fingerprints corresponding to the files included in the set (i.e., the fingerprints generated in step 704) may be stored in a first text file or a first table of a relational database.

In step 708, a programmer specifies a set of one or more files that the programmer intends to use in conjunction with software development system 602 to create the particular software component. In some embodiments, the location and/or name of each file that is specified by the programmer is stored in one or more configuration files or the like that are used by software development system 602.

In step 710, data-object tracking software 604 selects a file included in the set of files specified by the programmer. In step 711, software 605 obtains a fingerprint corresponding to the selected file. For example, data-object tracking software 604 may retrieve the file from a storage device and use the content of the file to create a fingerprint corresponding to the file. Preferably, the algorithm used to create the fingerprint is the same algorithm that was used in step 704 to create fingerprints.

In step 712, software 604 determines whether the fingerprint obtained in step 711 "matches" a fingerprint obtained in step 704 (as used herein, a first fingerprint "matches" a second fingerprint if the first fingerprint is identical or nearly identical to the second fingerprint). In embodiments where the fingerprints generated in step 704 are stored in a particular database, data-object tracking software 604 may make the determination by searching the database for a fingerprint that matches the fingerprint obtained in step 711. Component 605 may search the database itself if the database is accessible to the software 605, otherwise it may request component 606 to search the database by transmitting a search request to component 606.

If the fingerprint obtained in step 711 does not match any fingerprint generated in step 704, then process 790 may proceed to step 725, otherwise process 790 may proceed to step 722.

If step 722 is reached, then the fingerprint obtained in step 711 matches a particular fingerprint generated in step 704. In step 722, software 604 may store information that indicates that the file corresponding to the particular fingerprint is included in the set of files specified by the programmer. For example, software 604 may set to a predetermined value a variable (e.g., a flag variable that may have one of two states: TRUE or FALSE) associated with the certain fingerprint or the file corresponding thereto.

In step 725, software 604 determines whether all of the files included in the set of files specified by the programmer have been selected. If so, process 790 proceeds to step 730, otherwise process 790 proceeds to step 727. In step 727, software 604 selects another file included in the set of files specified by the programmer. After step 727, process 790 returns to step 711.

In step 730, software 604 determines whether a file included in the first set of files defined by the administrator is not included in the set of files specified by the programmer. That is, software 604 determines whether the programmer is not using a file that the programmer should be using.

In embodiments where each file included in the first set of files is associated with a variable having a predetermined value if, and only if, the file is included in the set of files specified by the programmer, software 604 may determine those files that included in the first set, but not included in the set specified by the programmer, by determining those files from the first set that are not associated with a variable having the predetermined value. If software 604 determines that the programmer is not using a file that the programmer should be using, the software 604, may send a notification to the administrator (or some other person or group of people) (step 732). The notification may include an electronic mail message or other message. The notification may include an identifier identifying the programmer.

Figure 7B:
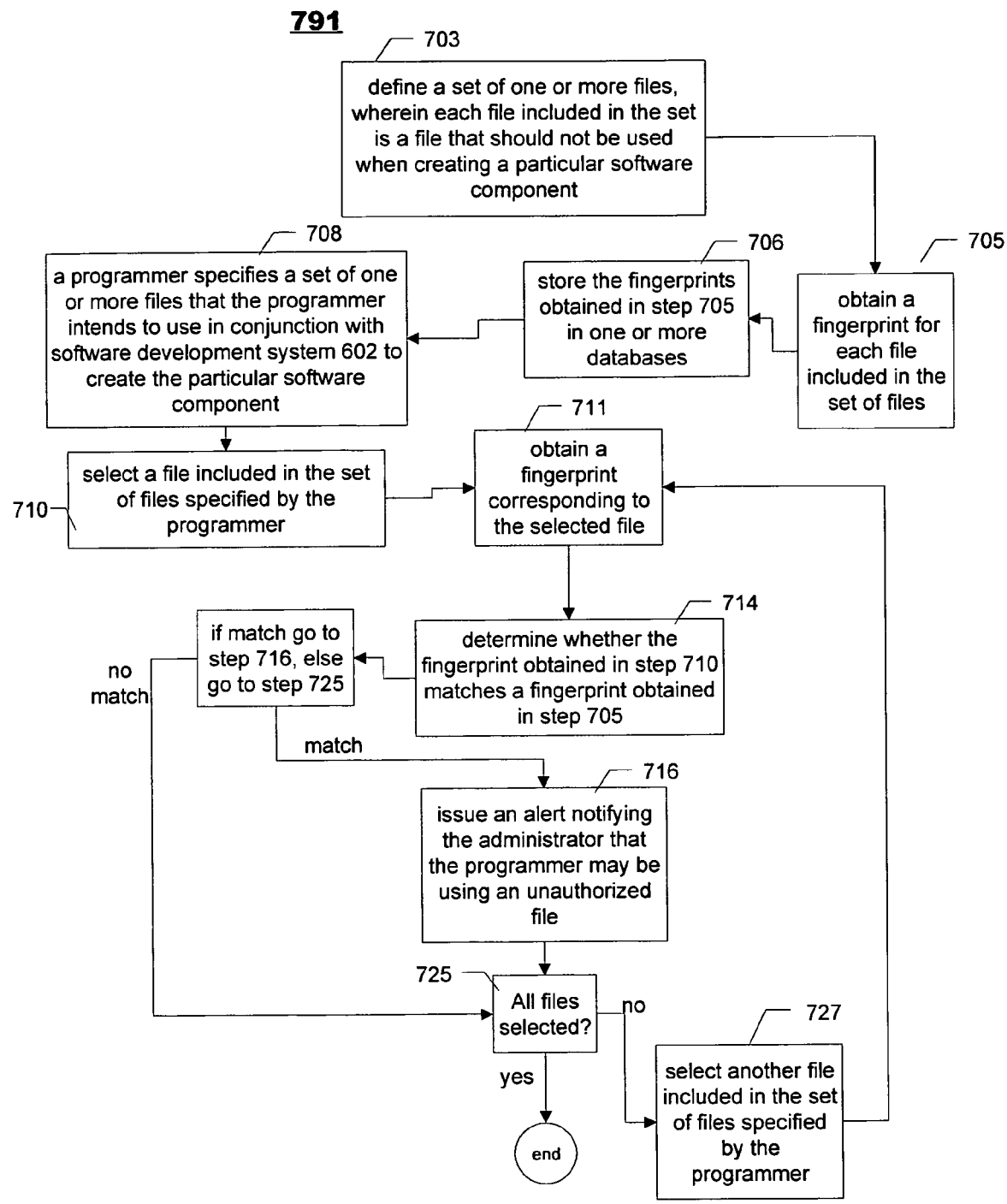

Referring now to FIG. 7B, FIG. 7B is a flow chart illustrating a process 791 that may, in part, be implemented by data-object tracking software 604.

Process 791 may begin in step 703, where an administrator defines a set of one or more files, wherein each file included in the set is a file that should not be used when creating a particular software component.

In step 705, a fingerprint is obtained for each file included in the set of files. For example, for each file included in the set of files, the file is retrieved from a storage device and the content of the file is used to create a fingerprint for the file. As discussed above, a hashing algorithm may be employed to create the fingerprint.

In step 706, the fingerprints obtained in step 705 are stored in one or more databases. In step 708, a programmer specifies a set of one or more files that the programmer intends to use in conjunction with software development system 602 to create the particular software component. In some embodiments, the location and/or name of each file that is specified by the programmer is stored in one or more configuration type files that are used by software development system 602.

In step 710, data-object tracking software 604 selects a file included in the set of files specified by the programmer. In step 711, software 605 obtains a fingerprint corresponding to the selected file. For example, data-object tracking software 604 may retrieve the file from a storage device and use the content of the file to create a fingerprint corresponding to the file. Preferably, the algorithm used to create the fingerprint is the same algorithm that was used in step 705 to create fingerprints.

In step 714, data-object tracking software 604 determines whether the fingerprint obtained in step 711 matches a fingerprint obtained in step 705. In embodiments where the fingerprints generated in step 705 are stored in a particular database, data-object tracking software 604 may make the determination by searching the database for a fingerprint that matches the fingerprint obtained in step 711. Component 605 may search the database itself if the database is accessible to the software 605, otherwise it may request component 606 to search the database by transmitting a search request to component 606.

If the fingerprint obtained in step 711 matches a fingerprint obtained in step 705, then data-object tracking software 604 may issue an alert notifying the administrator (or some other person or a group of people) that the programmer may be using a file that the programmer should not be using (step 716). For example, in step 716, software 604 may send an electronic mail message to the administrator informing the administrator that a programmer who is creating the software component may be using a file that the programmer should not be using. If the fingerprint obtained in step 711 does not match a fingerprint obtained in step 705, then the process may proceed to step 725.

In step 725, software 604 determines whether all of the files included in the set of files specified by the programmer have been selected. If so, process 791 may end, otherwise process 791 proceeds to step 727. In step 727, software 604 selects another file included in the set of files specified by the programmer. After step 727, process 700 returns to step 711.

Figure 7C:
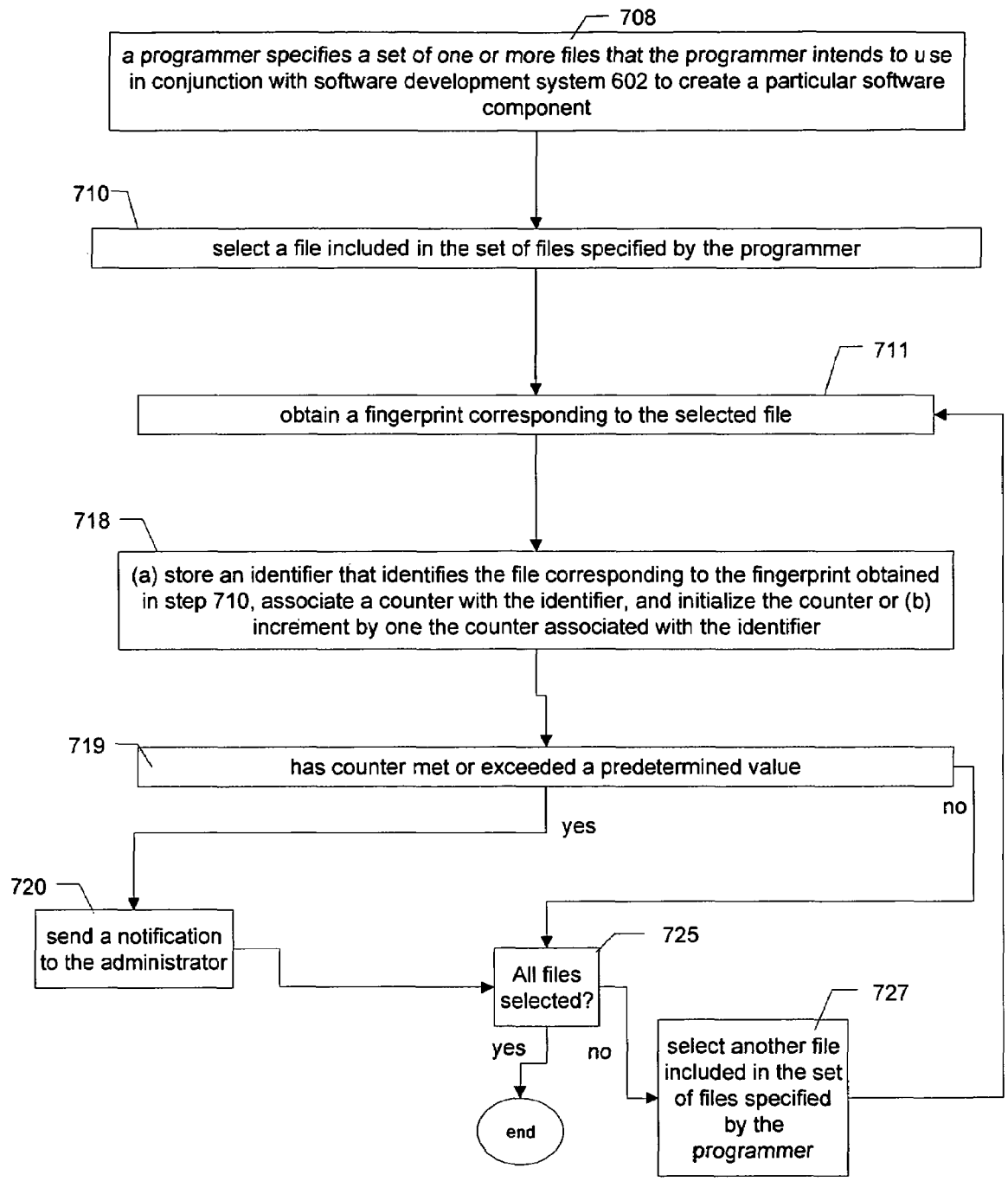

Referring now to FIG. 7C, FIG. 7C is a flow chart illustrating a process 792 that may, in part, be implemented by data-object tracking software 604.

Process 792 may begin in step 708, where a programmer specifies a set of one or more files that the programmer intends to use in conjunction with software development system 602 to create a particular software component.

In step 710, data-object tracking software 604 selects a file included in the set of files specified by the programmer. In step 711, software 605 obtains a fingerprint corresponding to the selected file. For example, data-object tracking software 604 may retrieve the file from a storage device and use the content of the file to create a fingerprint corresponding to the file.

In step 718, if an identifier that identifies the file corresponding to the fingerprint obtained in step 711 is not already stored in a certain database and associated with a counter, then software 604 stores in the certain database an identifier (e.g., a fingerprint or other file identifier) that identifies the file corresponding to the fingerprint obtained in step 711, associates a counter with the identifier, and initializes the counter, otherwise, software 604 increments by one the counter associated with the identifier. In this way, software 604 can maintain a record of the number of programmers who are using the file corresponding to the fingerprint obtained in step 711.

In step 719, software 604 determines whether the counter has met or exceeded a predetermined value. If so, software 604 may send a notification to the administrator (step 720). Preferably, the notification includes a file identifier identifying the file corresponding to the fingerprint obtained in step 711. The administrator may consider adding the identified file to a set of files that the administrator may recommend to other programmers.

In step 725, software 604 determines whether all of the files included in the set of files specified by the programmer have been selected. If so, process 792 may end or be repeated for another programmer, otherwise process 792 proceeds to step 727. In step 727, software 604 selects another file included in the set of files specified by the programmer. After step 727, process 791 returns to step 711.

Figure 8:
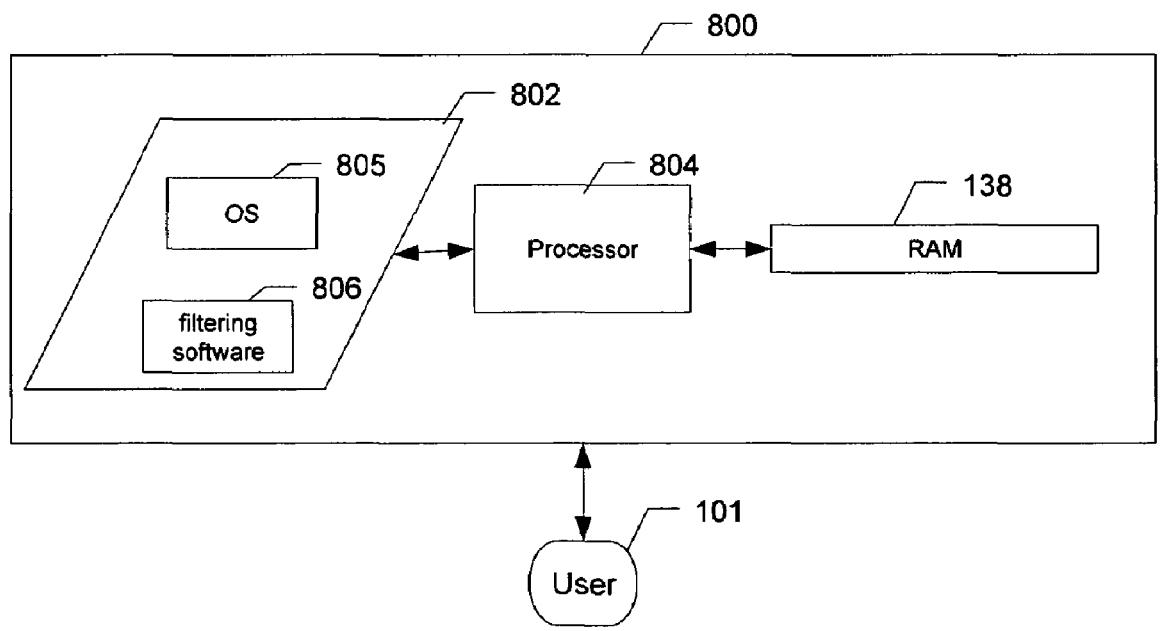
FIG. 8 illustrates a data-object filtering system according to an embodiment.

Referring now to FIG. 8, FIG. 8 illustrates a computer 800 according to an embodiment of the invention. Computer 800 includes a storage device 802 for storing files, a processor 804 for executing software, an operating system 805, and data-object filtering software 806, which may be an application that runs on top of the operating system or which may be a component of the operating system.

Computer 800 is a secured computer. That is, only trusted files are allowed to be stored in the file system of computer 800. Data object filtering software 806 functions to determine whether a file stored on the file system is trusted or not, and takes the appropriate action.

Thus, in some embodiments, software 806 has access to a set of fingerprints, each of which fingerprint corresponds to a trusted file. The set of fingerprints may be stored in a database stored on storage device 802 or stored remotely from computer 800. Accordingly, software 806 can be configured so that whenever a new file is sought to be added to the file system of computer 800, software 806, prior to the new file being added to the file system or immediately after it is added to the file system, generates a fingerprint corresponding to the file (step 902, see FIG. 9A) and then searches the set of fingerprints to determine whether the set of fingerprints includes a fingerprint that matches the generated fingerprint (step 904). If so, then the new file is a trusted file (step 906). If there is no match, then the file is not trusted and will not be allowed to be stored in the file system and/or is removed if it is stored in the file system (908).

Figure 9A:
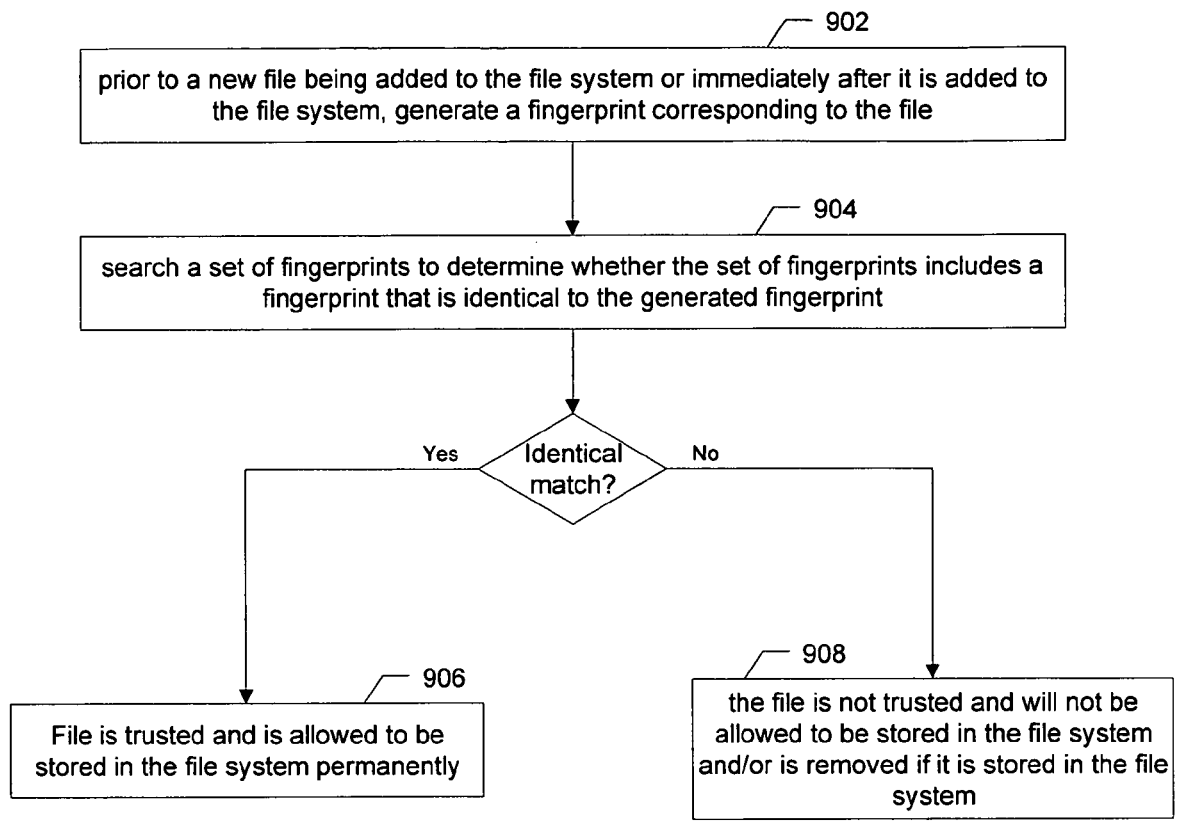
FIG. 9A is a flow chart illustrating a process according to an aspect of the invention.
Figure 9B:
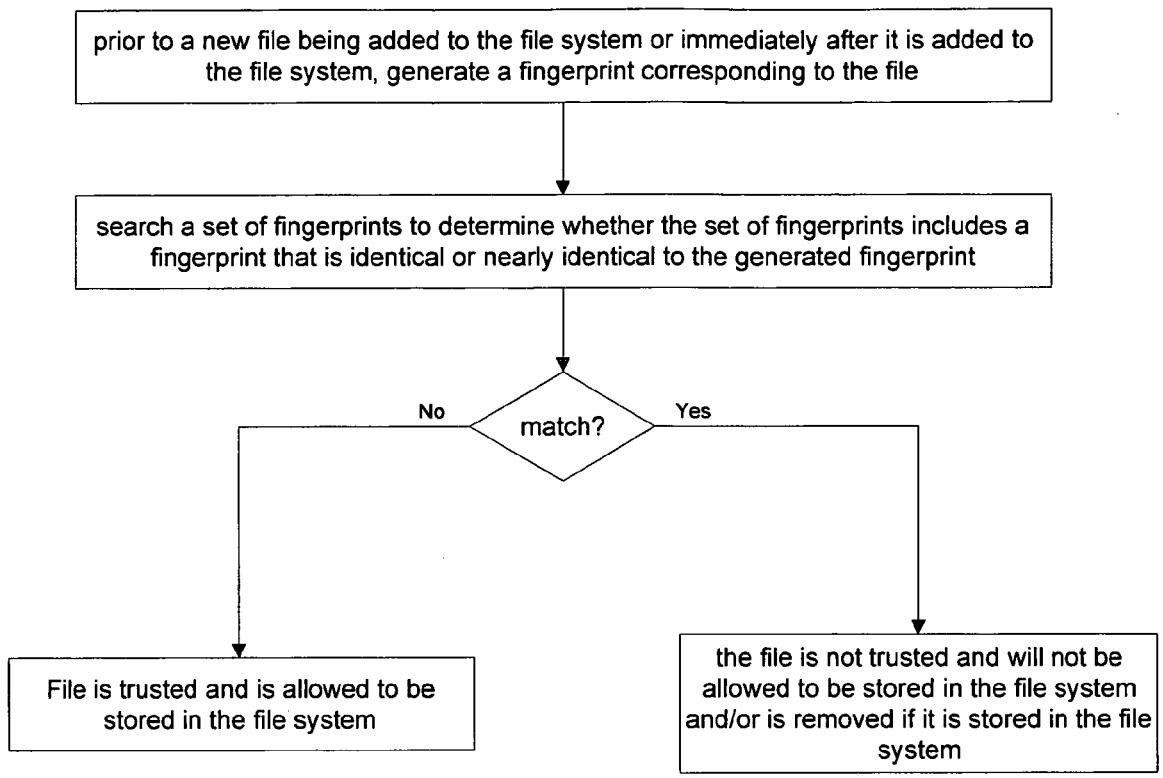
FIG. 9B is a flow chart illustrating a process according to an aspect of the invention.

FIG. 9B shows a variant of the process shown in FIG. 9A. The processes are similar, with one difference being that each fingerprint in the set of fingerprints corresponds to an un-trusted file, rather than a trusted file.

In another aspect, software 806 can be configured so that it allows only trusted programs to be run on computer 800. For example, in some embodiments, software 806 is configured so that any file can reside on storage device 802, but only certain trusted files stored on storage device 802 can be loaded into memory and executed by processor 804 or an interpreter.

Figure 10A:
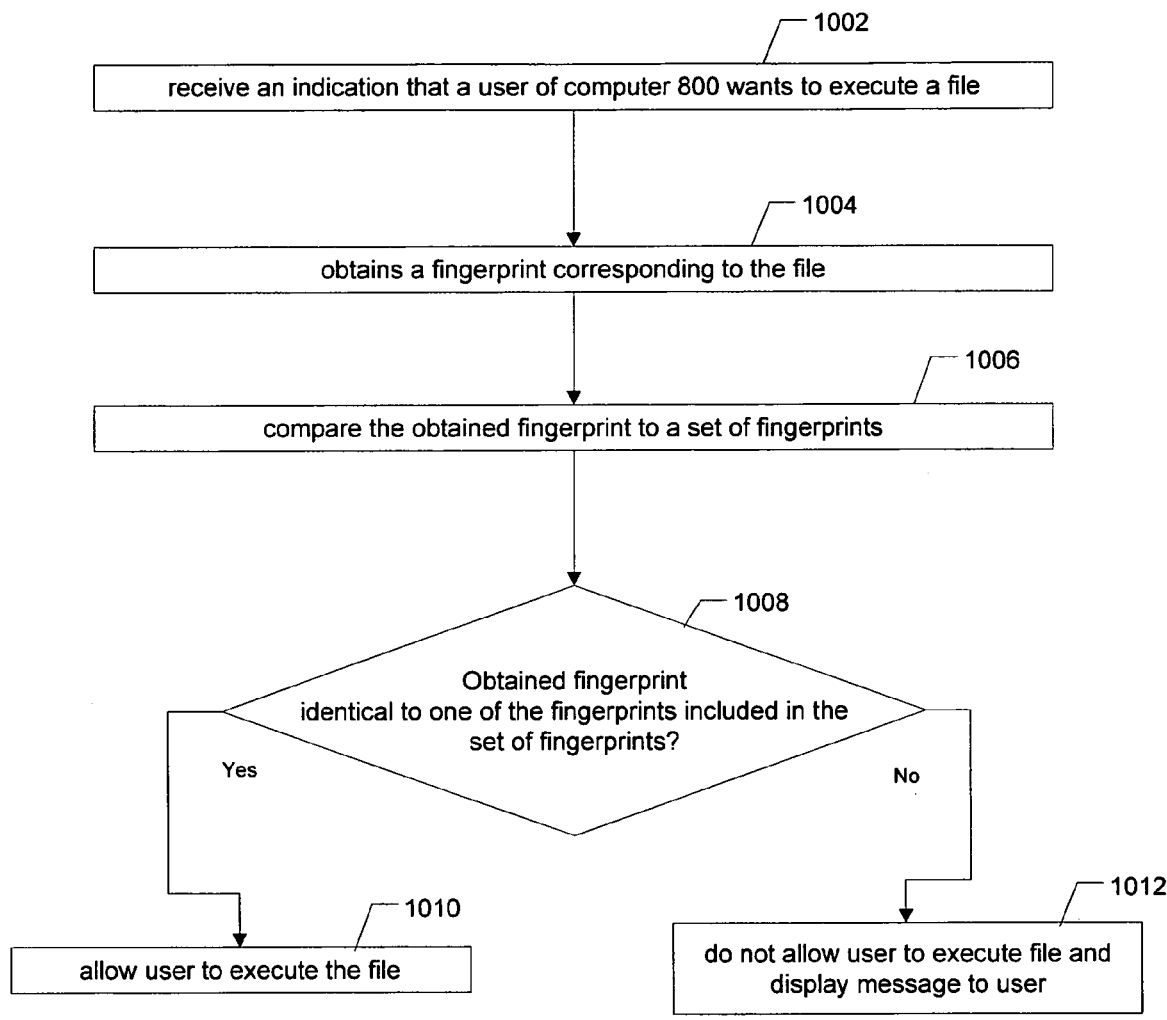
FIG. 10A is a flow chart illustrating a process according to an aspect of the invention.

In this embodiment, software 806 receives an indication that a user of computer 800 wants to execute a file (step 1002, see FIG. 10A). In response to receiving the indication, software 806 obtains a fingerprint corresponding to the file (step 1004). Next, software 806 compares the obtained fingerprint to a set of fingerprints, wherein each fingerprint in the set corresponds to a trusted executable file (step 1006). Next software 806 determines whether the obtained fingerprint is identical to a fingerprint included in the set (step 1008). If it is identical, software 806 allows the user to run the file (step 1010), otherwise software 806 does not allow the user to run the file and may display a message to the user informing the user that the file that the user wants to run is not a trusted file (step 1012).

Figure 10B:
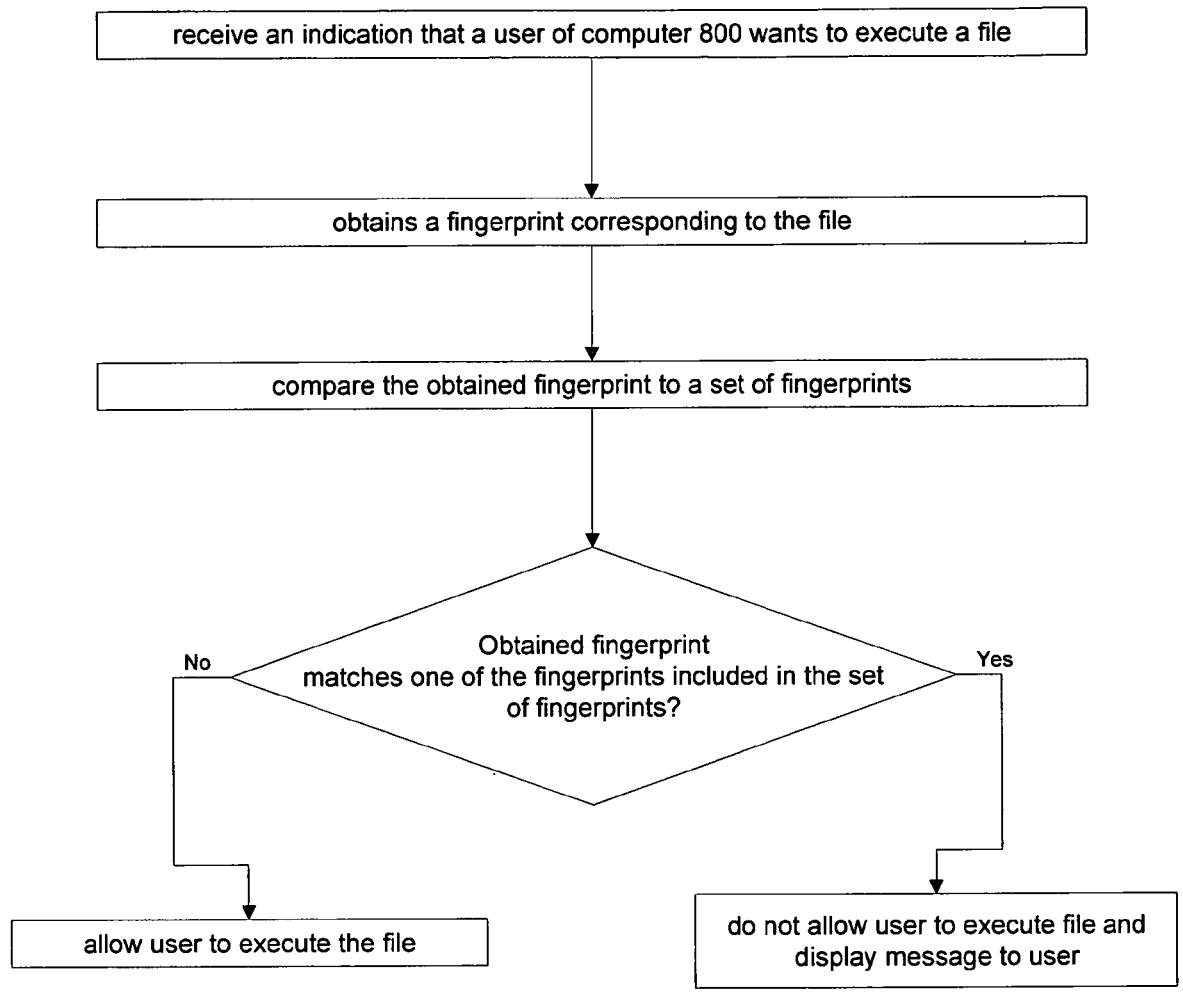
FIG. 10B is a flow chart illustrating a process according to an aspect of the invention.

FIG. 10B shows a variant of the process shown in FIG. 10A. The processes are similar, with one difference being that each fingerprint in the set of fingerprints corresponds to an un-trusted file, rather than a trusted file.

Figure 11:
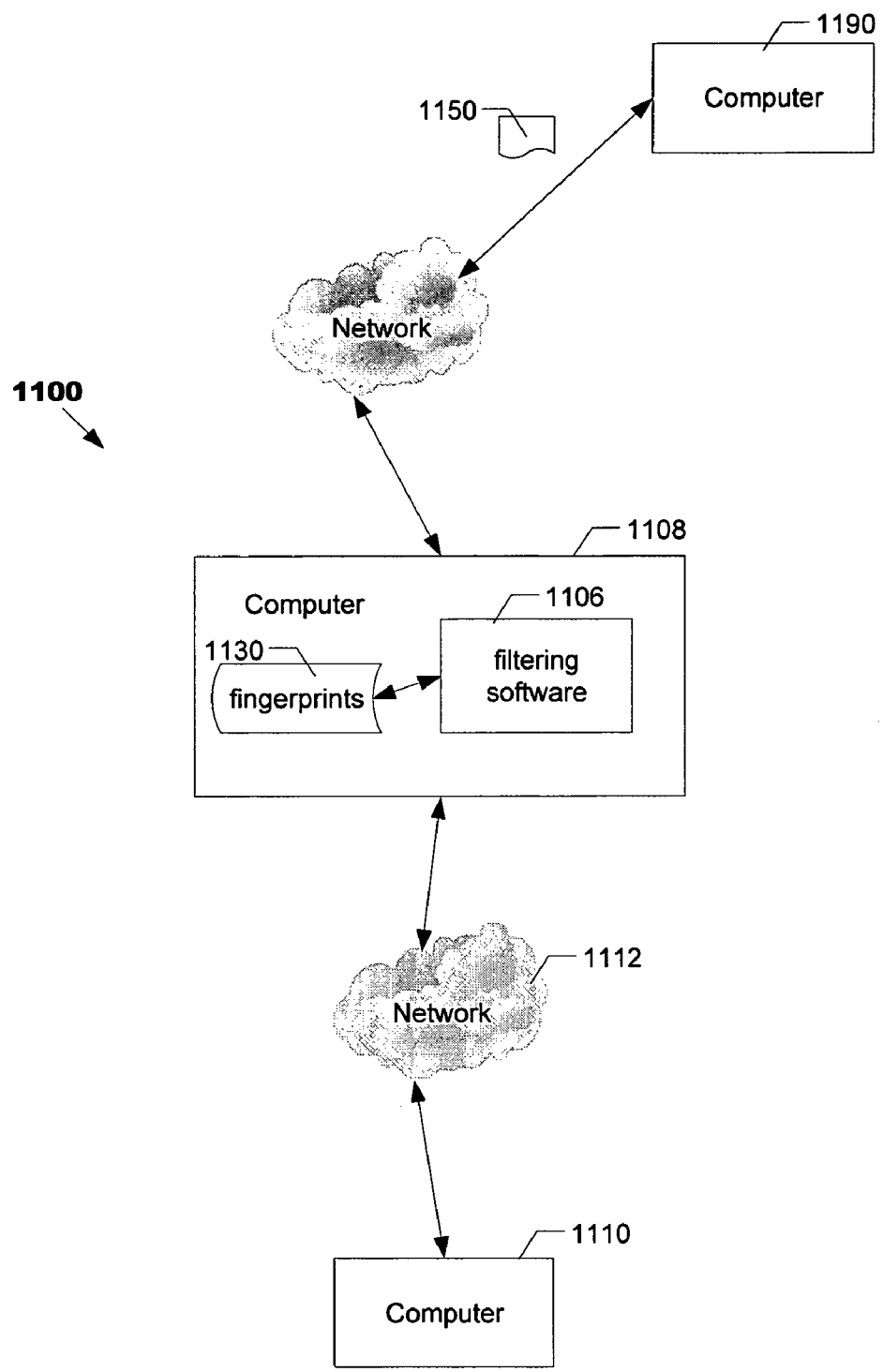
FIG. 11 illustrates a data-object filtering system according to another embodiment.

Referring now to FIG. 11, FIG. 11 illustrates a firewall system 1100 that functions as a firewall for at least one computer 1110 connected to system 1100. Computer 1110 may be connected to system 1100 directly or indirectly though a network 1112.

Firewall system 1100 ensures that only trusted files may be transmitted to computer 1110. Firewall system 1100 includes data-object filtering software 1106, which may be an application that runs on a computer 1108 of system 1100. Data-object filtering software 1106 functions to determine whether a file 1150 transmitted from a computer 1190 to computer 1110 is a trusted file. Software 1106 functions as a proxy for computer 1110 and has access to a set of fingerprints, 1130 each of which fingerprint corresponds to a trusted file. In some embodiments, when a user of computer 1190 wants to transmit a copy of the file 1150 to computer 1110, the user must transmit the copy to computer 1108 (step 1202, see FIG. 12A). After the file is placed on a storage device of computer 1108, software 1106 generates a fingerprint corresponding to the file (step 1204) and searches the set of fingerprints 1130 to determine whether the set of fingerprints includes a fingerprint that matches the generated fingerprint (step 1206). If so, then the file is a trusted file and software 1106 allows the file to be transmitted from computer 1108 to computer 110 (step 1208). If there is no match, then the file is not trusted and will be deleted from computer 1108 (step 1210).

Figure 12A:
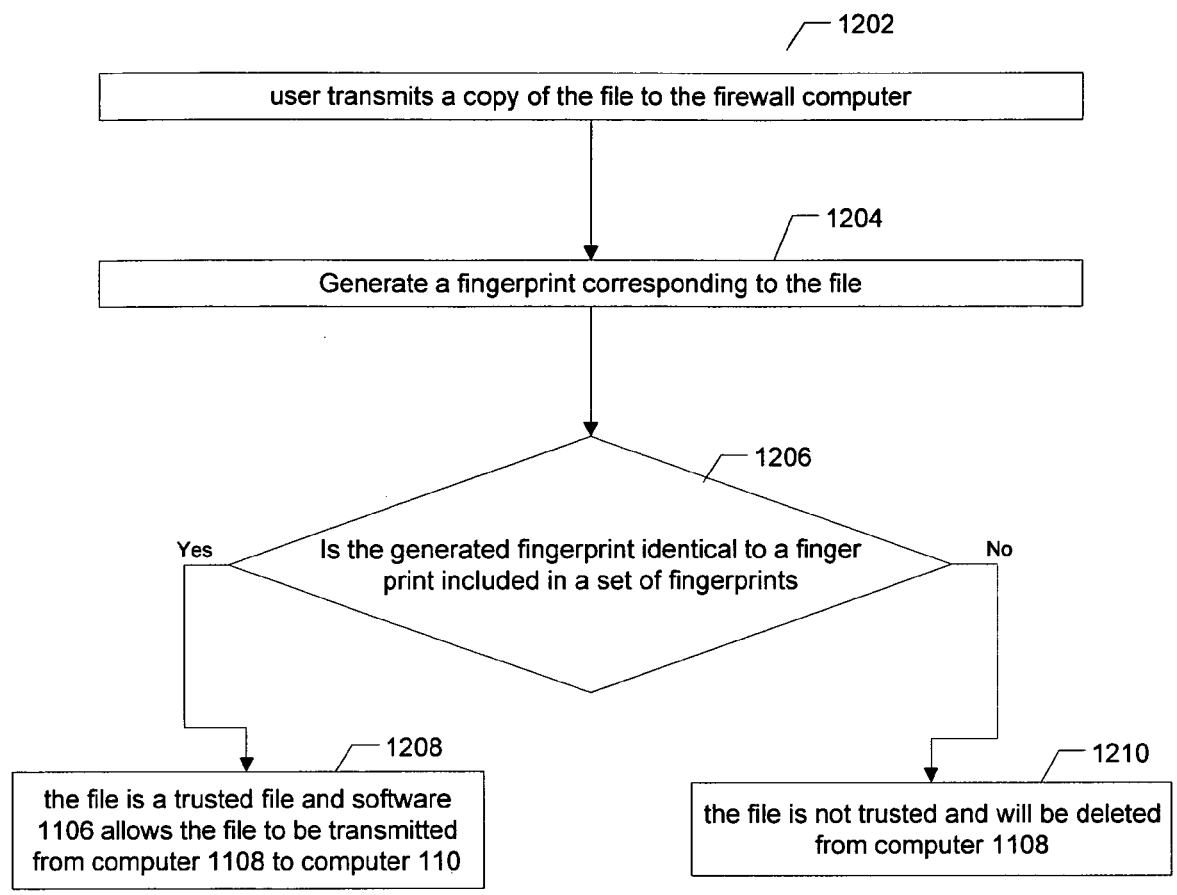
FIG. 12A is a flow chart illustrating a process according to an aspect of the invention.
Figure 12B:
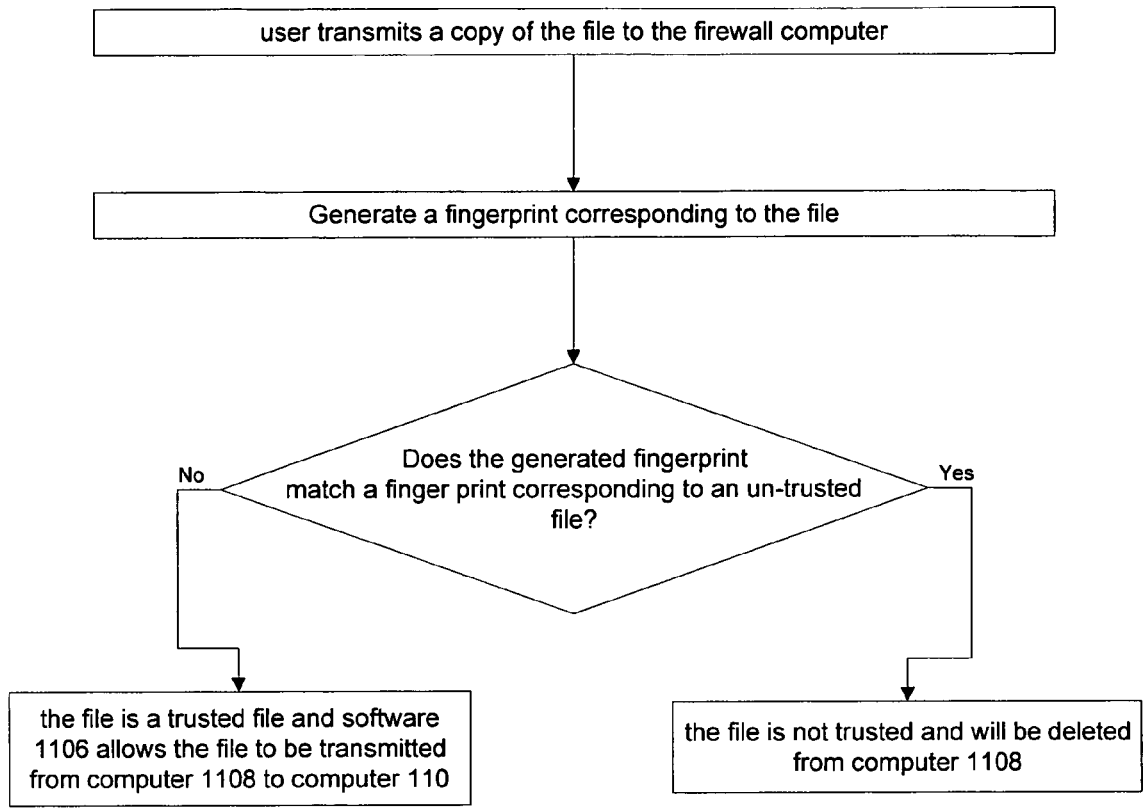
FIG. 12B is a flow chart illustrating a process according to an aspect of the invention.

FIG. 12B shows a variant of the process shown in FIG. 12A. The processes are similar, with one difference being that each fingerprint in the set of fingerprints corresponds to an un-trusted file, rather than a trusted file.

It will be readily apparent that the various processes and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, it is contemplated that some steps may be added and other steps omitted, and the order of the steps may be re-arranged. In other words, any sequence or order of steps that may be described does not necessarily indicate a requirement that the steps be performed in that order. The steps of processes described herein may be performed in any order practical. Further, some steps may be performed simultaneously.

What is claimed is:

1. A method for monitoring files used by a programmer in connection with the development of a software component, wherein the files used by the programmer include a first set of files, comprising:

for each file included in the first set of files, obtaining a fingerprint corresponding to the file, thereby obtaining a first set of fingerprints;

defining a second set of files, wherein each file included in the second set of files is a file that should be included in the first set of files;

for each file included in the second set of files, obtaining a fingerprint corresponding to the file, thereby obtaining a second set of fingerprints;

storing the second set of fingerprints in physical memory of a computing device; and determining whether each file included in the second set of files is also included in the first set of files, wherein the determining step comprises determining whether each fingerprint included in the second set of fingerprints is identical to a fingerprint included in the first set of fingerprints, wherein each obtained fingerprint is a function of the content of the file corresponding to the fingerprint; and wherein the step of obtaining a fingerprint corresponding to a file included in the first set of files comprises generating the fingerprint, and the step of generating the fingerprint comprises using a hashing algorithm to generate the fingerprint.

2. The method of claim 1, wherein the step of obtaining a fingerprint corresponding to a file included in the second set of files comprises generating the fingerprint, and the step of generating the fingerprint comprises using said hashing algorithm to generate the fingerprint.

3. The method of claim 1, wherein the steps of the method are performed by one or more processors executing a set of instructions stored in said memory of the computing device.

4. The method of claim 1, wherein data object tracking software selects a file in the second set of files and performs the determining step.

5. The method of claim 1, wherein each file included in the first set of files is associated with a variable having a predetermined value if the file is included in the second set of files.

6. The method of claim 5, further comprising:

determining files that are included in the first set of files but not included in the second set of files by determining the files in the first set that are not associated with the variable having the predetermined value.

7. A method for monitoring files used by a programmer in connection with the development of a software component, wherein the files used by the programmer include a first set of files, comprising:
for each file included in the first set of files, obtaining a fingerprint corresponding to the file, thereby obtaining a first set of fingerprints;
defining a second set of files, wherein each file included in the second set of files is a file that should be included in the first set of files;
for each file included in the second set of files, obtaining a fingerprint corresponding to the file, thereby obtaining a second set of fingerprints;
storing the second set of fingerprints in physical memory of a computing device; and
determining whether each file included in the second set of files is also included in the first set of files, wherein the determining step comprises determining whether each fingerprint included in the second set of fingerprints is identical to a fingerprint included in the first set of fingerprints, wherein each obtained fingerprint is a function of the content of the file corresponding to the fingerprint; and
wherein the determining step further comprises determining whether a fingerprint included in the second set of fingerprints is nearly identical to a fingerprint included in the first set of fingerprints if it is determined that said fingerprint from the second set of fingerprints is not identical to said fingerprint from the first set of fingerprints.

8. The method of claim 7, wherein the steps of the method are performed by one or more processors executing a set of instructions stored in said memory of the computing device.

9. The method of claim 7, wherein each file included in the first set of files is associated with a variable having a predetermined value if the file is included in the second set of files.

10. The method of claim 9, further comprising:
determining files that are included in the first set of files but not included in the second set of files by determining the files in the first set that are not associated with the variable having the predetermined value.

11. A method for monitoring files used by a programmer in connection with the development of a software component, wherein the files used by the programmer include a first set of files, comprising:
for each file included in the first set of files, obtaining a fingerprint corresponding to the file, thereby obtaining a first set of fingerprints;
defining a second set of files, wherein each file included in the second set of files is a file that should be included in the first set of files;
for each file included in the second set of files, obtaining a fingerprint corresponding to the file, thereby obtaining a second set of fingerprints;
storing the second set of fingerprints in physical memory of a computing device;
determining whether each file included in the second set of files is also included in the first set of files, wherein the determining step comprises determining whether each fingerprint included in the second set of fingerprints is identical to a fingerprint included in the first set of fingerprints, wherein each obtained fingerprint is a function of the content of the file corresponding to the fingerprint;
determining whether there is a fingerprint from the first set of fingerprints that is not identical to any fingerprint included in the second set of fingerprints; and
if there is a fingerprint from the first set of fingerprints that is not identical to any fingerprint included in the second set of fingerprints, then storing a file identifier that identifies the file corresponding to said fingerprint from the first set of fingerprints.

12. The method of claim 11, further comprising associating a counter with the file identifier and initializing the counter.

13. The method of claim 12, further comprising determining whether the counter is equal to or greater than a predetermined value, and if so, then transmitting a notification.

14. The method of claim 11, wherein the steps of the method are performed by one or more processors executing a set of instructions stored in said memory of the computing device.

15. The method of claim 11, wherein each file included in the first set of files is associated with a variable having a predetermined value if the file is included in the second set of files.

16. The method of claim 15, further comprising:
determining files that are included in the first set of files but not included in the second set of files by determining the files in the first set that are not associated with the variable having the predetermined value.

17. A method for monitoring files used by a programmer in connection with the development of a software component, wherein the files used by the programmer include a first set of files, comprising:
defining a second set of files, wherein each file included in the second set of files is a file that should not be included in the first set of files;
for each file included in the second set of files, obtaining a fingerprint corresponding to the file, thereby obtaining a set of fingerprints;
storing the set of fingerprints in physical memory of a computing device; and
determining whether at least one of the files included in the second set of files is also included in the first set of files, wherein the determining step comprises: obtaining a fingerprint corresponding to a file included in the first set of files, and determining whether the fingerprint corresponding to the file included in the first set of files is identical to a fingerprint corresponding to a file included in the second set of files, wherein each obtained fingerprint is a function of the content of the file corresponding to the fingerprint;
defining a third set of files, wherein each file included in the third set of files is a file that should be included in the first set of files;
for each file included in the third set of files, obtaining a fingerprint corresponding to the file, thereby obtaining a second set of fingerprints;
storing the second set of fingerprints in physical memory of the computing device;
determining whether there is a fingerprint corresponding to a file from the first set of files that is not identical to any fingerprint included in the second set of fingerprints;
storing a file identifier that identifies the file corresponding to said fingerprint if there is such a fingerprint; and
associating a counter with the file identifier and initializing the counter.

18. The method of claim 17, further comprising determining whether the counter is equal to or greater than a predetermined value, and if so, then transmitting a notification.

19. The method of claim 17, wherein the steps of the method are performed by one or more processors executing a set of instructions stored in said memory of the computing device.

20. A method for monitoring files used by a programmer in connection with the development of a software component, wherein the files used by the programmer include a first set of files, comprising:

defining a second set of files, wherein each file included in the second set of files is a file that should not be included in the first set of files;

for each file included in the second set of files, obtaining a fingerprint corresponding to the file, thereby obtaining a set of fingerprints;

storing the set of fingerprints in physical memory of a computing device; and determining whether at least one of the files included in the second set of files is also included in the first set of files, wherein the determining step comprises: obtaining a fingerprint corresponding to a file included in the first set of files, and determining whether the fingerprint corresponding to the file included in the first set of files is identical to a fingerprint corresponding to a file included in the second set of files, wherein each obtained fingerprint is a function of the content of the file corresponding to the fingerprint;

wherein the step of obtaining a fingerprint corresponding to a file included in the first set of files comprises generating the fingerprint, and the step of generating the fingerprint comprises using a hashing algorithm to generate the fingerprint.

21. The method of claim 20, wherein the step of obtaining a fingerprint corresponding to a file included in the second set of files comprises generating the fingerprint, and the step of generating the fingerprint comprises using said hashing algorithm to generate the fingerprint.

22. The method of claim 20, wherein the steps of the method are performed by one or more processors executing a set of instructions stored in said memory of the computing device.

* * * * *

UNITED STATES PATENT AND TRADEMARK OFFICE
CERTIFICATE OF CORRECTION

| | | |
|---|---|---|
| PATENT NO. | : 7,698,569 B2 | Page 1 of 1 |
| APPLICATION NO. | : 11/106469 | |
| DATED | : April 13, 2010 | |
| INVENTOR(S) | : Randy B. Beiter et al. | |

It is certified that error appears in the above-identified patent and that said Letters Patent is hereby corrected as shown below:

In Column 1, line 4 insert -- Cross-reference to related applications --.

In Column 8, line 67, delete "604," and insert -- 604 --, therefor.

Signed and Sealed this
Twelfth Day of April, 2011

David J. Kappos
*Director of the United States Patent and Trademark Office*